J. A. HEIDBRINK.
DENTAL WAX WARMING DEVICE.
APPLICATION FILED NOV. 19, 1919.

1,396,957.

Patented Nov. 15, 1921.
2 SHEETS-SHEET 1.

INVENTOR:
JAY A. HEIDBRINK.
BY Whiteley and Ruckman
ATTORNEYS.

J. A. HEIDBRINK.
DENTAL WAX WARMING DEVICE.
APPLICATION FILED NOV. 19, 1919.
1,396,957.
Patented Nov. 15, 1921.
2 SHEETS—SHEET 2.
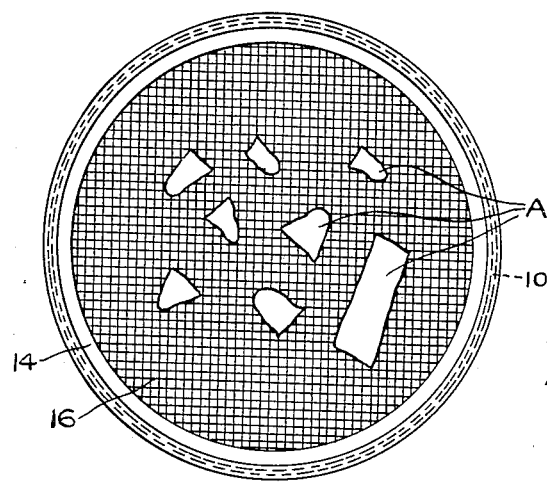
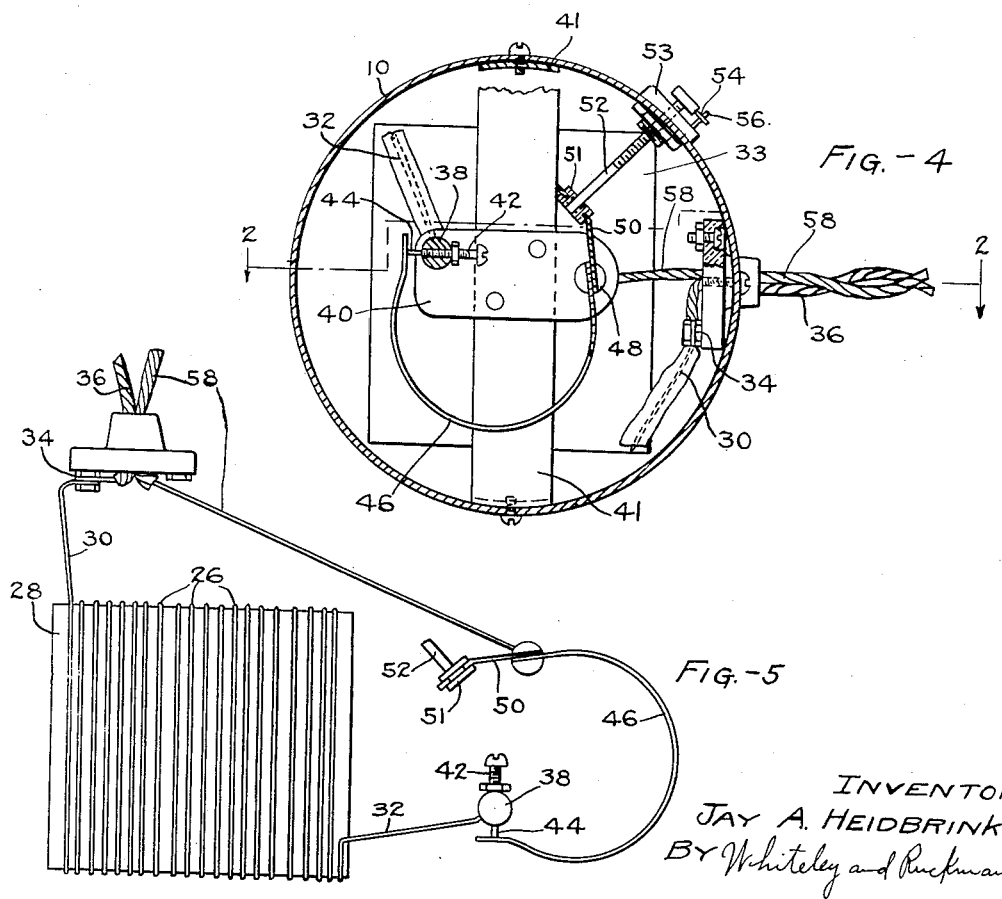
INVENTOR.
JAY A. HEIDBRINK
BY Whiteley and Ruckman
ATTORNEYS.

UNITED STATES PATENT OFFICE.

JAY A. HEIDBRINK, OF MINNEAPOLIS, MINNESOTA.

DENTAL WAX-WARMING DEVICE.

1,396,957.  Specification of Letters Patent.  Patented Nov. 15, 1921.

Application filed November 19, 1919. Serial No. 339,162.

*To all whom it may concern:*

Be it known that I, JAY A. HEIDBRINK, a citizen of the United States, residing at Minneapolis, in the county of Hennepin and State of Minnesota, have invented certain new and useful Improvements in a Dental Wax-Warming Device, of which the following is a specification.

My invention relates to a dental wax-warming device and an object is to provide a device which will warm and soften wax used for dental purposes so as to render it plastic and maintain it in this condition until it is desired to use the same without danger of melting the wax. For this purpose I provide a construction which embodies a container for holding pieces of dental wax, means for heating the container and means for automatically controlling the heating means so as to maintain a temperature which is sufficient to soften the wax to the desired degree of plasticity without melting.

The full objects and advantages of my invention will appear in connection with the detailed description thereof and the novel features embodied in my inventive idea will be particularly pointed out in the claims.

In the accompanying drawings, which illustrate the application of my invention in one form,—

Figure 1:
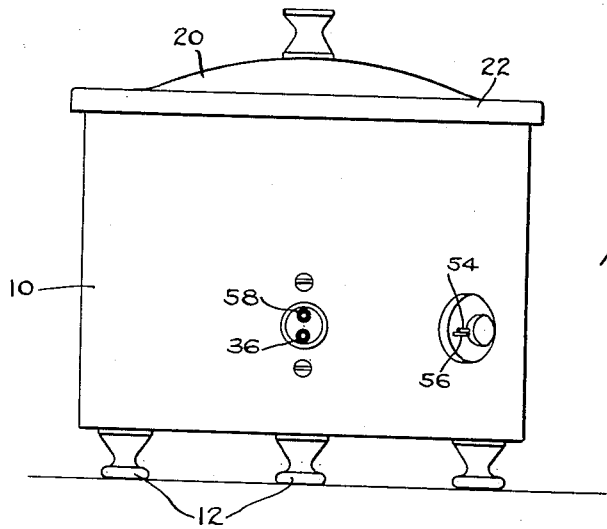
Figure 2:
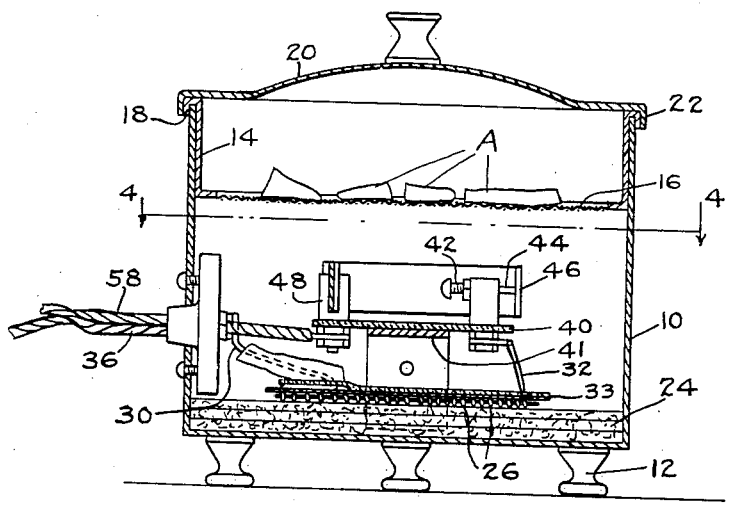

Figure 1 is an elevational view. Fig. 2 is a view in vertical section substantially on the line 2—2 of Fig. 4 looking in the direction of the arrow. Fig. 3 is a top plan view of a wax container showing several pieces of wax therein. Fig. 4 is a view in horizontal section on the line 4—4 of Fig. 2. Fig. 5 is a plan view of a heating element and thermostat which I may employ.

Referring to the particular construction shown in the drawings, 10 designates a cup-shaped member provided with feet 12 for supporting the device on any suitable surface. A container 14 for holding pieces of wax A is provided with an open-work bottom 16 such as wire mesh, and this container is removably mounted in the upper portion of the member 10 by means of an outwardly and downwardly turned flange 18 extending from the top of the container and engaging the top margin of the member 10. A cover 20 having a downwardly-turned flange 22 is used for closing the top of the device. In the bottom of the cup member 10 is placed insulating material 24, such as asbestos, upon which a heating element rests. As shown, this heating element consists of fine wire 26 wound helically upon a sheet of mica 28 with the convolutions of the wire extending in spaced relation from one end of the mica sheet to the other and the opposite ends 30 and 32 of the wire extending away from the sheet 28. A sheet of mica 33 may be placed over the sheet 28 and secured thereto in suitable manner, as by shellac. The end 30 is joined in suitable manner, as by a binding post 34, with a wire 36 constituting one of the feed wires of a source of electricity. The end 32 is connected to a post 38 which is mounted in such manner as to be insulated from the member 10 and for this purpose may be secured to a sheet of fiber or other insulating material 40 suitably mounted in the cup member, as by being secured to a strip 40 attached to the inside of the cup member. A screw 42 is adjustably mounted in post 38 and this screw has a contact end 44 adapted to be engaged by a free end of a thermostatic element 46 which is bow-shaped and held near its other end in a post 48 which is rotatably mounted upon the insulating material 40. The end 50 of the thermostatic element has a swivel engagement with a fiber disk 54 secured to the inner end of a screw 52. This screw has threaded engagement with an internally-threaded member 53 attached to the cup member 10, and the outer end of the screw extends outside of the cup member and is provided with a pointer or arm 54 adapted to engage a pin 56 and to be turned in either direction away from the pin 56 which is secured to the cup-shaped member. It is obvious that as the screw is turned in one direction or the other the free end of the thermostatic element will be caused to press more or less upon the contact point 44, whereby the temperature at which the thermostatic member will separate from the contact point may be varied. The second feed wire 58 is connected to the post 38 or to the thermostatic element adjacent this post, so that when the thermostat is closed current flows through the thermostatic element 46, the post 38, the convolutions of the wire 26 and the outgoing feed wire 36. When the heat in the cup member reaches the temperature for which the thermostat is set the thermostatic element will expand so that contact with the point 44 is broken and the heating effect of the current ceases until the temperature begins to fall.

The operation and advantages of my invention will be readily understood from the foregoing description. Pieces of wax placed in the container will be kept at the right degree of softness for use by the operator. The wax is therefore ready for use whenever desired, with the result that the operator can give his whole attention to the work in hand without having to resort to the common practice of holding the wax over a flame by means of tweezers. Not only does the use of my invention effect marked economy in time, but assures certainty of having the wax in the best condition for use as needed.

I claim:

1. A dental wax warming device comprising a cup-shaped member forming an inclosed chamber, a reticulate member in said chamber for supporting the wax, a heating element associated with the bottom of said chamber, and a thermostat between the heating element and the support having connection with the heating element for controlling the action of the element and the temperature in the chamber.

2. A dental wax warming device comprising a cup-shaped member forming an inclosed chamber, a reticulate member in said chamber for supporting the wax, an electric heater in said chamber, and a thermostat between the heating element and the support having connection with the heating element for controlling the action of the element and the temperature in the chamber.

3. A dental wax-warming device comprising a cup-shaped member, a wax container adapted to be supported in said member, said container having an open-work bottom, an electrical heating element underneath said container, and a thermostat connected with said heating element.

4. A dental wax-warming device comprising a cup-shaped member, a wax container adapted to be supported in said member, insulating material in the bottom of said member, an electrical heating element above said material, and a thermostat connected with said heating element.

5. A dental wax-warming device comprising a cup-shaped member, a wax container adapted to be supported in the top of said member, an electrical heating element in said member below said container, said heating element consisting of fine wire wound helically upon a sheet of insulating material, and a thermostat connected with said heating element.

6. A dental wax-warming device comprising a cup-shaped member which forms a heating chamber, a wax container adapted to be supported in the top of said chamber, said container having a wire mesh bottom, an electrical heating element in the bottom of said chamber, and a thermostat connected with said heating element, said thermostat being located in said chamber between said heating element and said container.

In testimony whereof I hereunto affix my signature.

JAY A. HEIDBRINK.